United States Patent Office 3,455,774
Patented July 15, 1969

3,455,774
PROCESS OF SURFACE TREATING AND LAMINATING PERFLUOROCARBON POLYMER FILMS AND LAMINATED PRODUCTS MADE THEREBY
William B. Lindsey, Tonawanda, and Mark M. Locey, Williamsville, N.Y., assignors to E. I. du Pont de Nemours and Company, Wilmington, Del., a corporation of Delaware
No Drawing. Continuation of application Ser. No. 468,140, June 29, 1965. This application Apr. 30, 1968, Ser. No. 725,542
Int. Cl. B32b 27/08
U.S. Cl. 161—189                                    20 Claims This application is a continuation of application Ser. No. 468,140, filed June 29, 1965, now abandoned.

This invention relates to laminates of polyimide polymer and fluorocarbon polymer films, and to the preparation of such laminates. As the characteristics of polyimide film are such that two adjacent surfaces of the film will not flow together when subjected to heat, a heat seal cannot be made. It is quite evident that if this film is to be made heat sealable a coating on the film has to be used. The problem of finding the correct material which will utilize the high temperature properties of the polyimide film and be heat sealable and adherable to the polyimide film thus arises.

Only a few polymers are commercially available which have the characteristics which allow them to be used as acceptable candidates for the heat sealable polyimide film coating. To qualify for this use the polymer must be stable at its melting point, and to at least about 250° C. and preferably higher, else the high temperature properties of the polyimide film cannot be utilized. Highly fluorinated polymers and especially copolymers of tetrafluoroethylene with hexafluoropropylene having melting points between 240 to 300° C. have successfully been used as the heat sealable coatings for polyimide film.

The problem is thus to prepare a heat sealable polyimide film. More specifically, the object is to prepare a polyimide film laminated with a perfluorocarbon polymer film, the laminate having good adhesion and good heat seal strength. Another object is to develop a process for the preparation of such laminates. Another object is to prepare such laminated structures without the use of any adhesion promoter such as polyalkylenimine; elimination of the adhesion promoter simplifies the process, eliminates the associated process and material expenses, and overcomes certain deficiencies when an adhesion promoter is used.

The objects have been realized by the process of laminating a polyimide film having a moisture content below about 1% and preferably below about 0.5% by weight, to a cementable film of a copolymer of tetrafluoroethylene and hexafluoropropylene at a temperature in the range of 240° to 280° C., at a pressure in excess of about 10 pounds per square inch for a time of at least 0.01 second, and subsequently heating the laminate to a temperature in the range of 350° to 500° C. for at least 1 second.

The process employed in preparing such structures is to bring the polyimide film and the cementable perfluorocarbon polymer film into a nip under pressure on a hot drum and to subsequently heat the thus prepared structure to the ultimate higher temperature. If desired, the laminate can then be wound up. When it is desired to make a two-side coated polyimide film, one may either make two passes through equipment as described or prepare it in one step by bringing all three layers of the laminate into the nip simultaneously.

It is preferred that in the first step of the process the films be brought into a nip at a temperature of 240° to 260° C. at a pressure of 100 to 1000 pounds per square inch for a time in excess of 0.05 second, and that in the second step of the process the laminate be heated to a temperature in the range of 400° to 475° C. for a time in excess of 5 seconds. In the second step of this process the heat can be introduced into the laminate by any convenient means such as radiant heaters, hot air, or the like.

By "cementable perfluorocarbon polymer film" is meant a film described in McBride and Wolinski, United States patent application Ser. No. 282,947 filed May 24, 1963 and assigned to the same assignee as that of the present application, now U.S. Patent No. 3,296,011. The entire disclosure of the McBride and Wolinski patented application is hereby incorporated by reference.

As described by McBride and Wolinski, the perfluorocarbon polymers with which this invention is specifically concerned are the resinous copolymers consisting essentially of from 95% to 50% by weight of tetrafluoroethylene and from 5% to 50% by weight of hexafluoropropene, the preparation and characteristics of which are described in United States Patent 2,833,686 (Sandt). The copolymers of this class containing hexafluoropropene within the weight range of from 7% to 27% constitutes a preferred group of polymers.

The perfluorocarbon polymer film can vary in thickness from as low as a quarter mil or less to as much as 10 mils or more.

The perfluorocarbon film is rendered "cementable" according to the process of McBride & Wolinski. The process comprises exposing the surface of a film of a copolymer of tetrafluoroethylene and hexafluoropropene to the action of an electrical discharge at substantially atmospheric pressure between spaced electrodes, said electrical discharge having an average energy level below 15 electron volts, in an atmosphere containing less than about 5% by volume of the vapor of an organic compound having a vapor pressure of at least 0.25 mm. of mercury at 60° C. in a gaseous carrier medium which will sustain the electrical discharge, whereby to render a surface of said film adherable to other materials. The permanency of the effect of this surface treatment is enhanced by subjecting the treated surface to a temperature of at least 150° C. for a period of at least one hour, and/or by applying to said surface a polymeric coating.

Using apparatus described more fully by McBride and Wolinski, a continuous self-supporting film of perfluorocarbon polymer is continuously passed between a set of spaced electrodes consisting of a rotating metal roll which is connected electrically to ground, and one or more stationary hollow metal tubes disposed parallel to the longitudinal axis of the roll and spaced a distance of from 0.03 to 0.125 inch from the surface thereof. The tubes are each connected electrically to a suitable power source which supplies to each tube electrode an alternating (or pulsating direct) current of from 0.3 to 5.5 RMS (root mean square) amperes at a voltage in the range of 10,000 to 30,000 volts, with pulsating peak voltages up to 100,000 volts, and at a frequency in the range of from 300,000 to 500,000 cycles per second. A mixture of inert gas, i.e., a gas substantially free of oxygen gas, e.g., nitrogen, and vapors of a non-oxidizing organic compound is continuously fed to the hollow interior of the electrode tubes through distributor ducts and issues from the tubes at the gap between each tube and the roll through suitable openings along the length of the tubes, whereby the electrical discharge between the electrodes takes place in a non-oxidizing atmosphere containing the organic vapors. The vapors may also be introduced into the reaction zone through one or more tubes separate from the electrode assembly. The assembly just described is suitably enclosed in a chamber held at atmospheric pressure and provided with the necessary openings, to facilitate maintenance of an oxygen gas-free atmosphere in the treating zone, and controlled exhaust of the mixture of nitrogen and organic vapors therefrom, and to minimize operational hazards. The treated film may be passed through a heating zone and/or a coating apparatus whereby to further condition the surface of the film to enhance the permanency of the adherency or "cementability" characteristics imparted to the film.

It should be understood that the film can be treated at normal room temperatures or at elevated temperatures. In general the permanency of the effect of the treatment, i.e. adherability or "cementability" is enhanced by maintaining the film at a temperature substantially above room temperature during treatment, e.g., at a temperature of from 50° to 100° C. or higher. In effect, the treatment at the higher temperature is realized by an in-line process wherein the film being extruded at high temperature is fed directly into the electric discharge treating apparatus before the film has an opportunity to cool down to room temperature.

In order to render the surface of the polyfluorocarbon polymer film adherable or "cementable" to other materials it is essential that the electrical discharge take place in substantially oxygen gas-free atmosphere containing in a minor proportion in a suitable gaseous carrier the vapors of a preferably non-oxidizing organic compound. For this purpose there can be employed any compound which is non-oxidizing under the conditions of the electrical discharge treatment, and which has a vapor pressure of at least 0.25 mm. of mercury at 60° C. While polymerizable organic substances are preferred, non-polymerizable organic monomers as well as polymerizable monomers can be used. As typical examples of suitable compounds there can be mentioned glycidyl methacrylate, methyl methacrylate, acrylonitrile, styrene, p-chlorostyrene, vinyl butyl ether, methyl vinyl ketone, vinyl acetate, 1-hexane, xylene, hexane, cyclohexane, carbon tetrachloride, chloroform, tetrahydrofuran, diethyl sulfone, N-vinyl-2-pyrrolidone, and tetraisopropyl titanate.

In the practice of the McBride & Wolinski process, the potential difference between the electrodes can vary from very low voltages on the order of 1000 volts up to pulsating peak voltages of 100,000 and above. In general, voltages in excess of 2000–3000 are desired to bring about effective treatment of the film surface. Frequencies from 350 cycles per second up to 500,000 cycles per second or higher can be used and frequencies in the range of 300,000 to 500,000 cycles are preferred for rapid and effective treatment.

In general, the effectiveness of the McBride & Wolinski treatment increases with amount of current to the electrodes for a given area of electrode and time of exposure. Current to the electrodes can range up to 5.5 RMS (root mean square) amperes or higher. However, it is preferred to operate in the range of 0.3 RMS ampere to 3.5 RMS amperes to give reasonable treating time on the one hand, and to avoid rapid degradation of the electrodes at too high currents on the other hand. Power to the high frequency generator can range from 10 to 1800 watts per lineal inch of the electrode length. The electrical discharge employed, operating within the parameters above specified, has an average energy level below 15 electron volts, and is not to be confused with the high or intermediate energy irradiations commonly used to treat polymeric surfaces.

Time of exposure to the electric discharge treatment is not especially critical and effective treatments are realized at exposure times as low as one second or less and no adverse effects are noted at times as long as 60 seconds. Longer exposure times can probably also be employed although for economic reasons exposure times as short as possible, consistent with effective treatment, would normally be employed.

Preferably, the electrodes are spaced from about .03 inch to about 0.125 inch apart. However, useful results can be obtained when the electrodes gap is as low as .015 inch to as much as 0.25 inch provided suitable adjustments in such features as amount of current, electrode dimension and exposure time are made.

As noted previously, the presence of organic vapor in the space between the electrodes is a vital requirement in the McBride and Wolinski process. A further requirement is that the organic vapor be employed as a dilute solution in a suitable carrier gas. In general, the concentration of the organic vapor in the carrier gas should not be greater than about 5% by volume. At higher concentrations unsatisfactory surface treating of the preformed structure results. The carrier gas should have characteristics such that it does not interfere with the maintenance of a continuous electrical discharge between the electrodes. Some gases with too low a breakdown potential may permit excessive arcing across the electrodes; those with too high dielectric strength tend to repress the electrical discharge. Particularly suitable carrier gases are nitrogen or carbon dioxide. Such gases as hydrogen or helium are also operable. Very satisfactory results have been obtained by bubbling nitrogen through the organic liquid to be vaporized at a rate of 240 cubic feet per hour and acceptable results were obtained at a gaseous flow rate as low as 30 cubic feet per hour. No adverse effects have been observed in the use of higher flow rates, though again, economic considerations would dictate against use of amounts exceeding those required to produce the desired effect.

As mentioned above, it is critical that the polyimide film have a moisture content of no greater than about 1% by weight when brought into the nip with the cementable perfluorocarbon polymer film in preparation of the laminate. This is important because otherwise an intolerable amount of bubbles are formed in the laminate during the laminating operation. It is preferred that the moisture content be below about 0.5% by weight. Excessive moisture present can be removed by preheating or drying the polyimide film at about 400° C. before the films being laminated are brought into the nip.

As is the case with the perfluorocarbon polymer film, the polyimide film can vary in thickness from as low as a quarter mil or less to as much as 10 mils or more. The polyimide useful according to the present invention is a polymer composition of $m$ units of 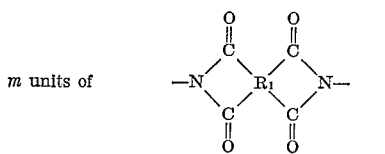

$n$ units of 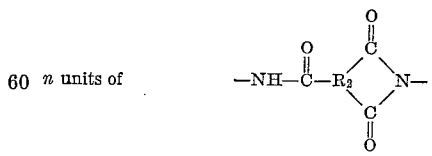

$p$ units of 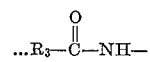

and $q$ units of $...R_4...$ wherein:

(a) $R_1$ is an organic tetravalent radical containing at least two carbon atoms, said tetravalent radical being bonded to four carbonyl groups, no more than two carbonyl groups being bonded to any one carbon atom of said tetravalent radical; $R_2$ is an organic trivalent radical containing at least two carbon atoms, said trivalent radical being bonded to three carbonyl groups, no more than two carbonyl groups being bonded to any one carbon atom of said trivalent radical; $R_3$ is a first organic divalent radical, containing at least one carbon atom, said first divalent radical being bonded to one carbonyl group and one nitrogen atom; and $R_4$ is a second organic divalent radical, containing at least two carbon atoms, said second divalent radical being bonded to two nitrogen atoms, the said two nitrogen atoms being attached to different carbon atoms of said second divalent radical;

(b) each free — bond is joined to a ... bond, and each free ... bond is joined to a — bond;

(c) $m$, $n$, $p$ and $q$ can each assume the value of zero or any integer;

(d) $m+n+p+q$ is sufficient to provide a polymer composition having an inherent viscosity of at least 0.1, preferably at least 0.3, as measured as a 0.5% by weight solution at 15° C. in fuming nitric acid;

(e) $2m$ is greater than or equal to $p$;

(f) $m+n=q$.

Inherent viscosity referred to in (d) above is measured at 15° C. at a concentration of 0.5% by weight of the poylmer in fuming nitric acid. To calculate inherent viscosity, the viscosity of the polymer solution is measured relative to that of the acid alone.

Inherent viscosity =

$$\frac{\text{natural logarithm } \frac{\text{Viscosity of solution}}{\text{Viscosity of solvent}}}{C}$$

where $C$ is the concentration expressed in grams of polymer per 100 milliliters of solution.

Provision (e) specifies that the number of imide of imide linkages in the polymer chain equals or exceeds the number of amide linkages. This can be seen as follows:

$m$ units containing $R_1$ contain $2m$ imide linkages;

$n$ units containing $R_2$ contain $n$ imide linkages and $n$ amide linkages;

$p$ units containing $R_3$ contain $p$ amide linkages;

($R_4$ units contain neither);

total imide linkages = $2m+n$;

total amide linkages = $n+p$;

thus, for the number of imide linkages to equal or exceed the number of amide linkages, $2m+n$ must equal or exceed $n+p$, or in simpler terms, $2m$ should equal or exceed $p$.

Provision (f) follows from the chemical stoichiometry and is a direct result of provision (b) which requires that the number of — bonds must equal the number of ... bonds. It indicates that when the polymer is made up of units containing $R_1$ and/or $R_2$, then units containing $R_4$ must also be present; i.e. when the polymer is based on any amount of tri or tetrafunctional carboxylic acid or functional derivative thereof, it must also then be based on diamine as well. In balancing the — and ... bonds, the equality $$2m+2n+p=p+2q$$

reduces to the form of provision (f).

The radicals $R_1$, $R_2$, $R_3$ and $R_4$ are preferably aromatic radicals.

Preferably, $R_1$ is a tetravalent aromatic radical, containing at least one carbocyclic or heterocyclic ring, said ring characterized by benzenoid unsaturation, the four carbonyl groups being attached directly to separate carbon atoms in a ring and each pair of carbonyl groups being attached to adjacent carbon atoms in a ring of the $R_1$ radical. Adjacent means ortho or peri, so that the dicarboxylanhydro rings are 5- or 6-membered, respectively.

It is preferred that the dicarboxylanhydro rings be 5-membered rings as follows:

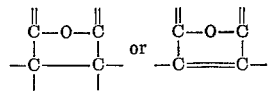

Preferably, $R_2$ is a trivalent aromatic radical, containing at least one carbocyclic or heterocyclic ring; said ring characterized by benzenoid unsaturation, the three carbonyl groups being attached directly to separate carbon atoms, there being a pair of carbonyl groups attached to adjacent carbon atoms in a ring of the $R_2$ radical.

Preferably, $R_3$ and $R_4$ are arylene, that is, they are divalent aromatic radicals, containing at least one carbocyclic or heterocyclic ring, said ring characterized by benzenoid unsaturation, the two substituents being attached directly to separate carbon atoms of the radical.

More specifically, $R_1$, $R_2$, $R_3$ and $R_4$ are selected from the group

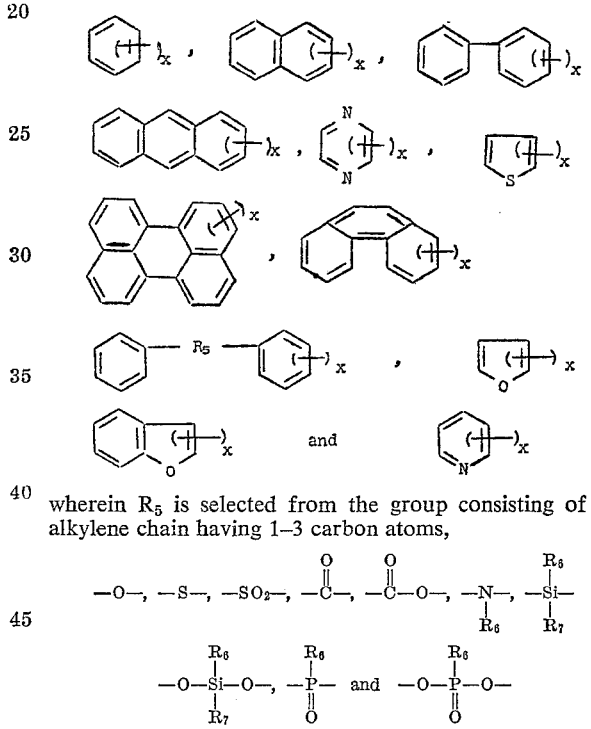

wherein $R_5$ is selected from the group consisting of an alkylene chain having 1–3 carbon atoms,

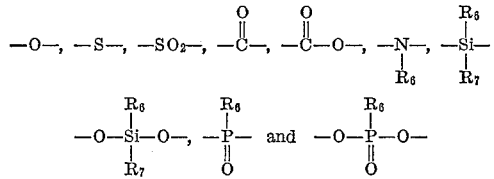

wherein $R_6$ and $R_7$ are alkyl or aryl, and substituted groups thereof.

For $R_1$, $x$ takes the value 4.

For $R_2$, $x$ takes the value 3.

For $R_3$ and $R_4$, $x$ takes the value 2.

In all cases, the $x$ valences can be attached to the same or different rings of the aromatic system.

Illustrative dianhydrides suitable for use in making the polyimides include:

pyromellitic dianhydride;
2,3,6,7-naphthalene tetracarboxylic dianhydride;
3,3′,4,4′-diphenyl tetracarboxylic dianhydride;
1,2,5,6-naphthalene tetracarboxylic dianhydride;
2,2′,3,3′-diphenyl tetracarboxylic dianhydride;
2,2-bis(3,4-dicarboxyphenyl) propane dianhydride;
bis(3,4-dicarboxyphenyl) sulfone dianhydride;
3,4,9,10-perylene tetracarboxylic dianhydride;
bis(3,4-dicarboxyphenyl) ether dianhydride;
ethylene tetracarboxylic dianhydride;
naphthalene-1,2,4,5-tetracarboxylic dianhydride;
naphthalene-1,4,5,8-tetracarboxylic dianhydride;
decahydronaphthalene-1,4,5,8-tetracarboxylic dianhydride;
2,6-dichloronaphthalene-1,4,5,8-tetracarboxylic dianhydride;

2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
cyclopentane-1,2,3,4-tetracarboxylic dianhydride;
pyrrolidine-2,3,4,5-tetracarboxylic dianhydride;
pyrazine 2,3,5,6-tetracarboxylic dianhydride;
2,2-bis(2,3-dicarboxyphenyl) propane dianhydride;
1,1-bis(2,3-dicarboxyphenyl) ethane dianhydride;
1,1-bis(3,4-dicarboxyphenyl) ethane dianhydride;
bis(2,3-dicarboxyphenyl) methane dianhydride;
bis(3,4-dicarboxyphenyl) methane dianhydride;
bis(2,3-dicarboxyphenyl) sulphone dianhydride;
benzene-1,2,3,4-tetracarboxylic dianhydride;
1,2,3,4-butane tetracarboxylic dianhydride;
thiophene-2,3,4,5-tetracarboxylic dianhydride;
3,4,3',4'-benzophenone tetracarboxylic dianhydride;
1,1,2,2-ethanetetracarboxylic dianhydride;
2,3,2',3'-benzophenone tetracarboxylic dianhydride;
2,3,3',4'-benzophenone tetracarboxylic dianhydride;
bis(3,4-dicarboxyphenyl)sulfide dianhydride;
cyclohexane-1,2,4,5-tetracarboxylic dianhydride;
dimethylcyclobutane-1,2,3,4-tetracarboxylic dianhydride;
tricyclo[4,2,2,0$^{2.5}$]-dec-7-ene-3,4,9,10 tetracarboxylic dianhydride; etc., and mixtures thereof.

Operable tricarboxylic monoanhydrides are those corresponding to the tetraacids of the above dianhydrides, by replacing any one of the four carboxyl groups by a hydrogen. A highly useful compound of this type is trimellitic acid anhydride. Other illustrative examples are 1,2,6-naphthalene tricarboxylic acid anhydride and 3,3',4-diphenyl tricarboxylic acid anhydride.

Among the diamines which are suitable for use in making the polyimides are:

meta-phenylene diamine;
para-phenylene diamine;
4,4'-diamino-diphenyl propane;
4,4-diamino-diphenyl methane;
benzidine;
4,4'-diamino-diphenyl sulfide;
4,4'-diamino-diphenyl sulfone;
3,3'-diamino-diphenyl sulfone;
4,4'-diamino-diphenyl ether;
2,6-diamino-pyridine;
bis-(4-amino-phenyl) diethyl silane;
bis-(4-amino-phenyl) diphenyl silane;
bis-(4-amino-phenyl)-N-methylamine;
1,5-diamino naphthalene;
3,3'-dimethyl-4,4'-diamino-biphenyl;
3,3'-dimethoxy benzidine;
2,4-bis(beta-amino-t-butyl) toluene;
bis-(para-beta-amino-t-butyl-phenyl) ether;
para-bis(2-methyl-4-amino-pentyl) benzene;
para-bis(1,1-dimethyl-5-amino-pentyl) benzene;
m-xylylene diamine;
p-xylylene diamine;
bis(para-amino-cyclohexyl) methane;
hexamethylene diamine;
heptamethylene diamine;
octamethylene diamine;
nonamethylene diamine;
decamethylene diamine;
3-methylheptamethylene diamine;
4,4-dimethylheptamethylene diamine;
2,11-diamino-dodecane;
1,2-bis-(3-amino-propoxy) ethane;
2,2-dimethyl propylene diamine;
3-methoxy-hexamethylene diamine;
2,5-dimethylhexamethylene diamine;
2,5-dimethylheptamethylene diamine;
5-methylnonamethylene diamine;
1,4-diamino-cyclohexane;
1,12-diamino-octadecane;
2,5-diamino-1,3,4-oxadiazole;
$H_2N(CH_2)_3S(CH_2)_3NH_2$;
$H_2N(CH_2)_3N(CH_3)(CH_2)_3NH_2$;
3,3'-dichlorobenzidene;
bis-(4-amino-phenyl) ethyl phosphine oxide;
bis-(4-amino-phenyl) phenyl phosphine oxide;
bis-(4-amino-phenyl)-N-phenylamine;
4,4'-diaminobenzophenone;
3,3'-diaminobenzophenone;
3,4'-diaminobenzophenone;
4-aminophenyl-3-aminobenzoate;

and mixtures thereof.

Operable aminoacids include m-aminobenzoic acid; p-aminobenzoic acid, glycine, and in general, any aminoacid corresponding to the above diamines where one of the two amino groups is replaced with a carboxyl group.

Polyimide film having laminated thereto on either one or both sides a perfluorocarbon polymer film according to this invention is useful in applications where a heat sealable film stable at high temperatures is desirable. These laminates perform with high reliability under extreme conditions and temperatures. The laminates are especially useful in electrical applications where heat sealability is desired such as in insulation for various types of wire, cable and flat cable, and strap insulation for motors and motor armatures. They are also useful for motor slot liners, insulation for motor protectors and fuses, and as capacitor dielectric and backing for printed circuits. They are also useful in non-electrical applications where heat sealability is desired such as spiral wrapped tubing for heat exchangers, various types of valves, gaskets, seals and belts.

A laminate according to this invention wherein a polyimide film has laminated thereto a perfluorocarbon film on both sides is heat sealable as such. A laminate of polyimide and only one perfluorocarbon film does not readily form heat seals when the polyimide surface of the laminate is placed against the perfluorocarbon surface of the laminate; however, the exposed perfluorocarbon surface of such a two-layer laminate can be readily treated by the McBride and Wolinski method to make it cementable as described above, and the two-layer laminate so treated constitutes a preferred product of the present invention.

Two-layer laminates of this invention (i.e. a polyimide/perfluorocarbon laminate), and also three-layer laminates of this invention (i.e. a perfluorocarbon/polyimide/perfluorocarbon laminate), as well as laminates of a larger number of layers, are useful for further lamination with other materials, in particular metals such as aluminum.

For example, a polyimide/perfluorocarbon polymer laminate can be treated on the perfluorocarbon surface as described above to make it cementable and then the treated surface brought into contact with a thin aluminum sheet of about 10 mils thickness or less at a temperature in excess of about 240° C. under a pressure in excess of about 10 pounds per square inch. This polyimide/perfluorocarbon/aluminum composite is useful as a shield for electrical conductors. It replaces the woven wire mesh shield and exterior insulation. In the composite, the principal purpose of the aluminum layer is as an electrical conductor, the polyimide serves as a strengthening member especially at high temperatures and as a support for the weaker aluminum layer, and the perfluorocarbon serves to bond the two together. The aluminum layer provides a shield against external electromagnetic fields, thus excluding any external interference and crosstalk between conductors; the aluminum essentially picks up and drains any external electrical fields. The aluminum shield may as desired either be grounded, be used as part of the electrical circuit (i.e., "driven"), or not, as required in different applications.

By way of further example, a perfluorocarbon/polyimide/perfluorocarbon three-layer laminate can be surface treated on one side to make it cementable as described above, and then the treated surface brought into contact with a thin aluminum sheet while simultaneously laminating to the other side of the aluminum a film of perfluorocarbon polymer which also has one cementable surface. In all cases the cementable surface of the FEP is brought into contact with the aluminum. This gives a perfluorocarbon / polyimide / perfluorocarbon / aluminum/perfluorocarbon five-layer laminate which is useful in making duct or tubing for carrying various gases and liquids, as this is a heat sealable composite. It is useful for the fabrication of spiral wrapped duct or tube and especially useful for the fabrication of double-layer, crossed-spiral duct or tubing, that is, where the two spirals are right and left hand spirals. In order to improve the flexibility of such duct or tubing, it can be fabricated with crimps or corrugation in the tubing. Without such circular or spiral corrugations the tubing is stiffer and tends to collapse when sharply bent.

The aluminum layer of the five-layer composite aids in the formation of the crimps and corrugations in the tube, as folds are more easily retained in the composite when it contains the aluminum layer. The aluminum thus contributes to the structure what is termed "dead fold." The aluminum also serves a second purpose, that of providing a permeability barrier to the gases or liquids being conveyed. The polyimide layer enables the tubing to be used under pressure, and especially confers on it the capability of being used under pressure at temperatures up to as high as 600° C. while resisting bursting. The interior perfluorocarbon layer bonds the polyimide layer to the aluminum, while the exterior perfluorocarbon layers enable the composite to be heat sealed during subsequent fabrication.

This duct constructed of the five-layer laminate is especially useful in the compressors of air conditioning systems for conveying chlorinated and fluorinated hydrocarbons and other compressible fluids used in such systems. It is also useful for conveying the hot exhaust gases from various types of internal combustion engines. It is further useful as a chafing sleeve for various types of hose and tubing to replace metal braid which is normally used in such applications.

In the aluminum composites described above, the aluminum sheet can be as thin as a quarter mil or less, and up to 10 mils or more.

Thick laminates useful as spacers, etc., can be built up by the processes of this invention described herein. Thus, insulator sections 5-mils in thickness can be built up in one pass from two 2-mil thick polyimide films with an intermediate two-side cementable 1-mil thick perfluorocarbon polymer film. The same laminar product can be made in a two-pass operation by following the procedures of Examples 1 and 2 below, followed by laminating the product of the Example 2 procedure to another polyimide film. Thicker laminar sections can be built up by using thicker component films or by adding additional perfluorocarbon polymer and polyimide film layers.

Products within the scope of this invention are heat sealable thermally stable laminates. The process of this invention employs no adhesive and thus offers savings in material and processing costs, and eliminates certain product deficiencies associated with the presence of an adhesive or adhesion promotor. The combination of a chemically inert film such as perfluorocarbon polymer with a highly thermally stable film such as a polyimide film offers unique features described below.

As a wire and cable wrap, polyimide film alone has severe shortcomings since it is not heat sealable. Perfluorocarbon polymer film alone has poor cut-through resistance and therefore cannot be used in this application. However, by combining the excellent cut-through resistance of polyimide film with the heat sealability and chemical inertness of the perfluorocarbon film, it is possible to utilize the combination as a wire and cable wrap.

Perfluorocarbon polymers tend to flow under pressure but when laminated to a stable base such as polyimide film the composite is suitable for such things as valves, gaskets and seals.

Polyimide film is highly dimensionally stable while perfluorocarbon polymers are not. The combination of the two results in a structure which is dimensionally stable and also chemically inert.

Perfluorocarbon polymer film possesses a high slip, low friction surface. In combination with a polyimide film it gives a thermally stable low friction film.

Laminating polyimide films with perfluorocarbon polymer films results in increasing the tear strength of the composite structure as compared to polyimide film alone about ten fold. The tear strength of polyimide film is less than 10 grams per mil while that of the combination approximates 100 grams per mil.

Combining polyimide film with perfluorocarbon polymer film increases the modulus and tensile strength of the composite structure as compared to the perfluorocarbon polymer. The composite structure exhibits a tensile modulus of 252,000 as compared to 43,000 pounds per square inch which is the modulus of a film of a copolymer of tetrafluoroethylene and hexafluoropropylene and a tensile strength of 16,800 as compared to 3,000 pounds per square inch for the perfluorocarbon film.

The following specific examples are not intended for limitation and will serve to further illustrate the principles and practice of this invention. Parts and percentages are by weight unless otherwise indicated.

EXAMPLE 1

A laminate consisting of a 1-mil thick polyimide film combined with a cementable 0.5-mil thick film of a copolymer of tetrafluoroethylene and hexafluoropropylene was prepared by bringing together the polyimide film and the cementable perfluorocarbon film with the cementable side of the perfluorocarbon film toward the polyimide film passing the composite between a rubber pressure roll and a heated drum in a continuous manner using a pressure of 200 pounds per square inch and a temperature of 245° C. The polyimide was that based on pyromellitic acid and 4,4'-diaminodiphenyl ether. The "cementable" treatment was according to McBride and Wolinski referred to above. This polyimide/perfluorocarbon film laminate was then passed through a heating chamber where it was heated to 450° C. for 10 seconds. The heat seals of the perfluorocarbon-to-perfluorocarbon side were improved by a factor of five by the post heat treatment. Polyimide to perfluorocarbon seals were zero (375° C., 10 seconds dwell, 10 pounds per square inch).

The product of Example 1 was compared to a similarly constituted laminate prepared with polyethylenimine adhesive promoter to secure the perfluorocarbon and polyimide layers to one another, but without the 450° C. post heat treatment. Samples of each film were then heat sealed to itself perfluorocarbon-to-perfluorocarbon. The sealed films were then aged at 200° C., and periodically the heat-seals peeled to check their strength. After 5 days aging at 200° C., the heat seals of film made with polyethylenimine had deteriorated to zero strength. By comparison, the heat seals of post-heat treated laminate made with no polyethylenimine fell to zero seal strength only after about 50 days of 200° C. aging.

EXAMPLE 2

The perfluorocarbon side of the laminate prepared as described in Example 1 was subjected to an electrostatic discharge-glycidyl methacrylate treatment according to McBride and Wolinski to impart cementability to the perfluorocarbon surface, as described above. Heat seals made between the polyimide and the perfluorocarbon side were 800 grams per inch compared to zero when the cementability treatment was omitted.

EXAMPLE 3

A perfluorocarbon/polyimide/perfluorocarbon laminate was prepared in one pass through a nip roll laminator. The first perfluorocarbon film was 0.25 mil thick, the second perfluorocarbon film was 0.5 mil thick, and the polyimide film was 1 mil thick. The perfluorocarbon was a copolymer of tetrafluoroethylene and hexafluoropropylene. The polyimide was that based on pyromellitic acid and 4,4′-diaminodiphenyl ether. The two perfluorocarbon films each had one cementable surface, which in each case was placed into contact with the polyimide film. The films were bonded at 240–250° C. at a pressure of about 300 pounds per square inch for about 0.06 second. The heat seal of this laminate to itself was 260 grams per inch.

The same laminate was then heated at various temperatures for various times, and it then formed substantially stronger heat seals, as shown in the following table:

| Heat treatment | | Heat seal |
|---|---|---|
| Temperature (°C.) | Time (sec.) | (grams per inch) |
| 464 | 60 | 1,540 |
| 460 | 30 | 600 |
| 450 | 12 | 1,356 |
| 420 | 60 | 910 |
| 405 | 30 | 916 |
|  |  | 260 |

The laminates were subjected to heat aging tests. The results show that the post-heat-treated laminates retain their improved sealing properties with respect to the control (no post heat treatment) laminate after prolonged time at elevated temperatures. Following are data for some of the above films aged at 200° C.:

Film and treatment

No post-heat treatment        Heat seal
(days aged):                     (grams per inch)
  1 ———————————————————— 6
  5 ———————————————————— 0
 10 ———————————————————— 0

Post-heated at 464° C. (days aged):
  1 ———————————————————— 576
  5 ———————————————————— 400
 10 ———————————————————— 255

Post-heated at 460° C. (days aged):
  1 ———————————————————— 860
  5 ———————————————————— 620
 10 ———————————————————— 530

Post-heated at 450° C. (days aged):
  1 ———————————————————— 825
  5 ———————————————————— 865
 10 ———————————————————— 395

EXAMPLE 4

A laminate consisting of 1 mil thick polyimide film/1 mil thick perfluorocarbon film/1 mil thick aluminum foil was prepared by bringing together the polyimide film, two-side cementable perfluorocarbon film and aluminum foil, passing the composite between a rubber pressure roll and a heated drum in a continuous manner using a pressure of 200 pounds per square inch and a temperature of 245° C. The three ply laminate was then passed through a heating chamber where it was heated to 450° C. for 20 seconds. The heat seals were improved by a factor of five by the post heat treatment.

A like laminate was also prepared by bringing together the product of Example 2 and a 1 mil thick aluminum foil at 240° C. at a pressure of 300 pounds per square inch.

EXAMPLE 5

An 0.5 mil perfluorocarbon/1 mil polyimide/0.5 mil perfluorocarbon laminate was prepared as described in Example 3. It was then treated as described hereinabove to make one surface cementable. An 0.5 mil perfluorocarbon/1 mil polyimide/0.5 mil perfluorocarbon/3 mil aluminum/0.5 mil perfluorocarbon laminate was then prepared by bringing the cementable side of the perfluorocarbon/polyimide/perfluorocarbon laminate into contact with the 3 mil aluminum, while simultaneously bringing the cementable side of an 0.5 mil perfluorocarbon film into contact with the second side of the aluminum, in a nip roll laminator at 240° C. at a pressure of about 400 pounds per square inch.

A similar laminate was also prepared where the polyimide was 2 mils thick.

In both cases, the heat seals of both of the above laminates were improved by a factor of five by the post heat treatment.

EXAMPLE 6

Example 3 was repeated, the three layers being initially brought together at 248° C. at a pressure of about 300 pounds per square inch for about 0.06 second.

Part of the film was post heat treated at 469° C. for 17 seconds.

The results were as follows:

|  | Not post heat treated (grams per inch) | Post heat treated (grams per inch) |
|---|---|---|
| Heat seal | 410 | 760 |
| Peel adhesion (polyimide/0.5 mil perfluorocarbon) | 276 | 880 |
| Peel adhesion (polyimide/0.25 mil perfluorocarbon) | 192 | 880 |

EXAMPLE 7

The relative performance of a polyimide/perfluorocarbon laminate made with a polyethylenimine adhesion promoter and a post-heat treated polyimide/perfluorocarbon laminate made with no adhesion promoter was determined by evaluation as follows: Two layers of laminate were wrapped around each electrical conductor sample. Each layer had a 50% (distance) overlap, and the second wrap was wound counter to the first. The wire taped with the polyimide/perfluorocarbon lamiante made with the polyethylenimine adhesion promoter had a 1 mil first wrap cover of a polyimide/polyethylenimine/0.5 mil thick perfluorocarbon laminate (with the perfluorocarbon film outside) and a second wrap cover of a 0.5 mil thick perfluorocarbon/polyethylenimine/1 mil thick polyimide/polyethylenimine/0.5 mil thick perfluorocarbon laminate. The post-heated polyimide/perfluorocarbon taped wire used a post-heated 0.25 mil thick perfluorocarbon/1 mil polyimide/0.5 mil thick perfluorocarbon laminate for both wraps (with the 0.5 mil perfluorocarbon film outside). Thus, in both cases, taking the overlap into consideration, the electrical conductor was insulated by a total of 4 mils of polyimide and 3 mils of perfluorocarbon.

After wrapping, the insulation jackets were heat sealed by passing the wrapped wire through a 4 foot furnace at 800° F. Exposure time was one minute. After this treatment, the insulation jackets of both films were extremely difficult to unwrap. Usually the film would tear before they could be unwound. At this point, it was difficult, if not impossible, to distinguish between wires wrapped with the polyimide/polyethylenimine/perfluorocarbon laminate and with the post-heated polyimide/perfluorocarbon laminate.

The ability of the insulation jackets of these wires to resist 200° C. degradation was evaluated by aging samples 30 inches long at 200° C. for various periods. After being aged, one end of the wire was fastened to a ½ inch mandrel rotated by an electric motor and the other end to a 3 pound weight. Under this tension, the entire length of the wire was wound onto the mandrel with the motor. The motor was reversed; the coil was unwound and then rewound in the opposite direction. In this maner, the wire was wound twice in each direction—each opposite to the foregoing direction. At the end of this test, the wire coils (from the fourth bend) were visually inspected for breaks in the insulation. If no breaks were found, they were immersed in a 1 percent solution of a surfactant (sodium lauryl sulfate). A potential difference between the water solution and the conductor was increased so that at the end of 30 seconds the potential difference was 3,000 volts (RMS). Samples that withstood this maximum voltage for one minute passed the "Dielectric Test."

The following data were obtained:

| Time in 200° C. oven before testing | Wire taped with polyimide/polyethylenimine/perfluorocarbon film | Wire taped with post heated polyimide/perfluorocarbon film |
|---|---|---|
| 10 days | Failed dielectric test | Passed dielectric test. |
| 20 days | do | Do. |
| 30 days | do | Do. |
| 40 days | do | Do. |
| 50 days | do | Do. |
| 60 days | do | Do. |
| 70 days | do | Do. |
| 80 days | do | Do. |

The life of the post-heated polyimide/perfluorocarbon wrapped wire was not determined as the sample was used up at 80 days.

The following Examples 8 through 12 have not as of the date of filing of this application actually been carried out but are set forth here for the purpose of teaching how to practice various aspects of this invention.

EXAMPLE 8

A mandrel having a 3 inch diameter and 30 feet long is spirally wrapped with a tetrafluoroethylene skived tape to provide it with a release surface. Then a 2 inch wide 0.5 mil perfluorocarbon/1 mil polyimide/0.5 mil perfluorocarbon/1 mil aluminum/0.5 mil perfluorocarbon laminate is tightly wrapped in a spiral upon the tetrafluoroethylene skived tape with a 50% (distance) overlap on each turn, with the aluminum layer toward the inside and the polyimide layer toward the outside, and so as to leave both ends of the tetrafluoroethylene skived tape accessible. A second tetrafluoroethylene skived tape is then tightly wound over the structure. The entire assembly is placed in a forced draft oven at 260° C. for about 30 minutes, permitting the thermal expansion of the assembly to force out any air which was trapped between the various layers of the assembly. The oven temperature is raised to about 300° C. (a temperature above the fusion point of the perfluorocarbon fluoropolymer but below that of the tetrafluoroethylene fluoropolymer) and held at this temperature for about 1 hour, until the spirally wrapped laminate has fused to itself (at this temperature, the perfluorocarbon will not adhere to the tetrafluoroethylene as the tetrafluoroethylene polymer does not melt). The assembly is cooled in a ventilated atmosphere, and the mandrel and tetrofluoroethylene skived tapes are removed, leaving the 3 inch diameter spiral tube intact.

EXAMPLE 9

Example 8 is repeated except that after winding the first spiral wrap of perfluorocarbon/polyimide/perfluorocarbon/aluminum/perfluorocarbon laminate, a second spiral of the same laminate is similarly wound upon it in a reverse spiral (i.e., the opposite "hand"). The outer tetrafluoroethylene skived tape is then wound, and the assembly treated in the same way. The tubing formed is a double spiral having substantially greater structural strength than that of Example 8.

It will be clear that tubes of greater and smaller diameter and/or length can be fabricated in the same way, that the thickness of the various layers of the laminate may be varied to give tubing suitable for different applications, that the width of laminated film which is employed may be greater or smaller, and that operating conditions such as heating times will vary depending on the heating capacity of the oven, the size of the mandrel, the thickness of the laminate, etc.

EXAMPLE 10

A bundle consisting of (a) a twisted pair of nickel plated copper primary conductors (American Wire Gauge No. 22), each covered with polyimide/perfluorocarbon insulation, and (b) a silver coated copper drain (i.e., ground) wire (American Wire Gauge No. 22) is overwrapped spirally with a ¼ inch wide 1 mil polyimide/0.5 mil perfluorocarbon/0.5 mil aluminum laminate, with a 50% (distance) overlap on each turn, and with the aluminum layer toward the inside. The aluminum side of the laminate contacts the drain wire which serves to short successive turns of the aluminum foil, thus precluding an inductive effect, and which serves to provide an easy termination of the aluminum shield to ground; the aluminum shield prevents the primaries from picking up extraneous signals. A jacket is applied over the shielded bundle to provide mechanical and electrical protection by wrapping spirally with a ¼ inch wide heat-sealable 1 mil polyimide/0.5 mil perfluorocarbon laminate (product of Example 2). For a given length of conductor, there is a substantial saving in weight for this cable when compared with a similar cable shielded with braided wires.

EXAMPLE 11

A cable is fabricated as in Example 10, except that it consists of the drain wire and only a single primary conductor in place of the twisted pair. For 1000 feet of cable, approximately 0.5 pound of the polyimide/perfluorocarbon/aluminum laminate is required to provide the shield. A similar cable fabricated with a braided silver coated copper wire (American Wire Gauge No. 36) sheath requires approximately 3.5 pounds of wire to provide the shield for 1000 feet of cable. The substantial difference in weight is very significant in some uses.

In Examples 10 and 11, fabrication of the laminate shielded cable is easier and requires less complicated machinery than required in fabricating a cable with braided shield. In these examples, it will be clear that each primary conductor and drain wire can be of any gauge desired, may if desired be solid or stranded, and can be fabricated from any electrically conductive metal, optionally coated with a second metal; that bundles containing primary conductors numbering into the hundreds may if desired be fabricated into similar shielded cables; that more than one drain wire may if desired be used; and that the width of the laminate tape used for wrapping the spiral shield will vary, depending on the number and gauge of the primary conductors and drain wires.

EXAMPLE 12

An 0.5 mil perfluorocarbon/1 mil polyimide/0.5 perfluorocarbon laminate is prepared as described in Example 3. It is then treated as described hereinabove to make both surfaces cementable. An 0.5 mil aluminum/0.5 mil perfluorocarbon/1 mil polyimide/0.5 mil perfluorocarbon/0.5 mil aluminum laminate is then prepared from the two-side cementable laminate by bringing it into a nip between two 0.5 mil aluminum foils in a nip roll laminator at 240° C. at a pressure of about 400 pounds per square inch.

Example 10 is then repeated, employing the product of the previous paragraph for the spiral wound shield in place of the laminate used in Example 10. Shielding of the primary conductors is particularly effective.

We claim:

1. The process of laminating together a polyimide film having a moisture content below about 1% by weight and a film of a copolymer of tetrafluoroethylene and hexafluoropropylene, the latter film having one surface rendered cementable by subjecting said surface to an electrical discharge at substantially atmospheric pressure between spaced electrodes, said electrical discharge having an average energy level below 15 electron volts, in an atmosphere containing less than about 5% by volume of the vapor of an organic compound having a vapor pressure of at least 0.25 mm. of mercury at 60° C. in a gaseous carrier medium which sustains the electrical discharge: said process comprising bringing together one surface of said polyimide film and said cementable surface of said copolymer film, and holding them together at a temperature in the range of 240° to 280° C. at a pressure in excess of about 10 pounds per square inch for at least 0.01 second to form a two-layer laminate, and subsequently heating the laminate to a temperature in the range of 350° C. to 500° C. for at least 1 second.

2. The process of claim 1 in which the exposed surface of said copolymer film of said resulting laminate is subsequently rendered cementable by subjecting said surface to an electrical discharge at substantially atmospheric pressure between spaced electrodes, said electrical discharge having an average energy level below 15 electron volts, in an atmosphere containing less than about 5% by volume of the vapor of an organic compound having a vapor pressure of at least 0.25 mm. of mercury at 60° C. in a gaseous carrier medium which sustains the electrical discharge.

3. The process of laminating together a polyimide film having a moisture content below about 1% by weight, a first film of a copolymer of tetrafluoroethylene and hexafluoropropylene, and a second film of a copolymer of tetrafluoroethylene and hexafluoropropylene, each of said first film and said second films having a surface rendered cementable by subjecting said surface to an electrical discharge at substantially atmospheric pressure between spaced electrodes, said electrical discharge having an average energy level below 15 electron volts, in an atmosphere containing less than about 5% by volume of the vapor of an organic compound having a vapor pressure of at least 0.25 mm. of mercury at 60° C. in a gaseous carrier medium which sustains the electrical discharge: said process comprising bringing together one surface of said polyimide film and said cementable surface of said first copolymer film; holding them together at a temperature in the range of 240° to 280° C. at a pressure in excess of about 10 pounds per square inch for at least 0.01 second to form a two-layer laminate; subsequently heating the laminate to a temperature in the range of 350° C. to 500° C. for at least 1 second; bringing together the exposed surface of said polyimide film of said two-layer laminate and said cementable surface of said second copolymer film to make a three-layer structure; holding said three-layer structure together at a temperature in the range of 240° to 280° C. at a pressure in excess of about 10 pounds per square inch for at least 0.01 second; and subsequently heating said three-layer structure to a temperature in the range of 350° C. to 500° C. for at least 1 second.

4. The process of laminating together a polyimide film having a moisture content below about 1% by weight, a first film of a copolymer of tetrafluoroethylene and hexafluoropropylene, and a second film of a copolymer of tetrafluoroethylene and hexafluoropropylene, each of said first and said second films having a surface rendered cementable by subjecting said surface to an electrical discharge at substantially atmospheric pressure between spaced electrodes, said electrical discharge having an average energy level below 15 electron volts, in an atmosphere containing less than about 5% by volume of the vapor of an organic compound having a vapor pressure of at least 0.25 mm. of mercury at 60° C. in a gaseous carrier medium which sustains the electrical discharge: said process comprising simultaneously bringing together said polyimide film and said first and said second copolymer film, with said polyimide film sandwiched in between and contacting the said cementable surfaces of said first and said second copolymer films; holding them together at a temperature in the range of 240° to 280° C. at a pressure in excess of about 10 pound per square inch for at least 0.01 second to form a three-layer laminate; and subsequently heating the laminate to a temperature in the range of 350° C. to 500° C. for at least 1 second.

5. The process of claim 2 including the further step of bringing a thin aluminum sheet into surface contact with said last-mentioned exposed cementable surface of said copolymer film; and holding the entire structure together at a temperature in excess of about 240° C. and a pressure in excess of 10 pounds per square inch for at least 1 second to form a three-layer laminate.

6. The process of laminating together a polyimide film having a moisture content below about 1% by weight, an aluminum sheet and a film of a copolymer of tetrafluoroethylene and hexafluoropropylene, the latter film having both surfaces rendered cementable by subjecting said surface to an electrical discharge at substantially atmospheric pressure between spaced electrodes, said electrical discharge having an average energy level below 15 electron volts, in an atmosphere containing less than about 5% by volume of the vapor of an organic compound having a vapor pressure of at least 0.25 mm. of mercury at 60° C. in a gaseous carrier medium which sustains the electrical discharge: said process comprising simultaneously bringing together said polyimide film, said aluminum sheet and said copolymer film, with said copolymer film sandwiched in between said polyimide film and said aluminum sheet; holding them together at a temperature in the range of 240° to 280° C. at a pressure in excess of about 10 pounds per square inch for at least 0.01 second to form a three-layer laminate; and subsequently heating the laminate to a temperature in the range of 350° C. to 500° C. for at least 1 second.

7. The process of making a four-layer laminate which comprises taking (1) a polyimide film having a moisture content below about 1% by weight and (2) a first film of a copolymer of tetrafluoroethylene and hexafluoropropylene having a surface rendered cementable by subjecting said surface to an electrical discharge at substantially atmospheric pressure between spaced electrodes, said electrical discharge having an average energy level below 15 electron volts, in an atmosphere containing less than about 5% by volume of the vapor of an organic compound having a vapor pressure of at least 0.25 mm. of mercury at 60° C. in a gaseous carrier medium which sustains the electrical discharge; bringing said polyimide film and said first copolymer film together with the said cementable surface of said first copolymer film in contact with said polyimide film; holding them together at a temperature in the range of 240° to 280° C. at a pressure in excess of about 10 pounds per square inch for at least 0.01 second to form a two-layer laminate; heating said two-layer laminate to a temperature in the range of 350° C. to 500° C. for at least 1 second; bringing together the exposed surface of said polyimide film of said two-layer laminate and the cementable surface of (3) a second film of a copolymer of tetrafluoroethylene and hexafluoropropylene, said cementable surface having been rendered cementable by subjecting said surface to an electrical discharge at substantially atmospheric pressure between spaced electrodes, said electrical discharge having an average energy level below 15 electron volts, in an atmosphere containing less than about 5% by volume of the vapor of an organic compound having a vapor pressure of at least 0.25 mm. of mercury at 60° C. in a gaseous carrier medium which sustains the electrical discharge; holding the resulting three-layer structure together at a temperature in the range of 240° to 280° C. at a pressure in excess of about 10 pounds per square inch for at least 0.1 second to form a three-layer laminate; heating said three-layer laminate at a temperature in the range of 350° C. to 500° C. for at least 1 second; subjecting the exposed surface of one of said copolymer films of said three-layer laminate to an electrical discharge at substantially atmospheric pressure between spaced electrodes, said electrical discharge having an average energy level below 15 electron volts, in an atmosphere containing less than about 5% by volume of the vapor of an organic compound having a vapor pressure of at least 0.25 mm. of mercury at 60° C. in a gaseous carrier medium which sustains the electrical discharge; bringing together said exposed surface of said one of said copolymer films of said three-layer laminate and (4) one surface of a thin aluminum sheet holding the resulting four-layer structure together at a temperature above about 10 pounds per square inch for at least 0.01 second to form a four-layer laminate.

8. The process of making a four-layer laminate which comprises taking (1) a polyimide film having a moisture content below about 1% by weight, (2) a first film of a copolymer of tetrafluoroethylene and hexafluoropropylene and (3) a second film of a copolymer of tetrafluoroethylene and hexafluoropropylene, each of said first and said second films having a surface rendered cementable by subjecting said surface to an electrical discharge at substantially atmospheric pressure between spaced electrodes, said electrical discharge having an average energy level below 15 electron volts, in an atmosphere containing less than about 5% by volume of the vapor of an organic compound having a vapor pressure of at least 0.25 mm. of mercury at 60° C. in a gaseous carrier medium which sustains the electrical discharge; simultaneously bringing together said polyimide film and said first and said second copolymer film, with said polyimide film sandwiched in between and contacting the said cementable surfaces of said first and said second copolymer films; holding them together at a temperature in the range of 240° to 280° C. at a pressure in excess of about 10 pounds per square inch for at least 0.01 second to form a three-layer laminate; and subsequently heating the laminate to a temperature in the range of 350° C. to 500° C. for at least 1 second; subjecting the exposed surface of one of said copolymer films of said three-layer laminate to an electrical discharge at substantially atmospheric pressure between spaced electrodes, said electrical discharge having an average energy level below 15 electron volts, in an atmosphere containing less than about 5% by volume of the vapor of an organic compound having a vapor pressure of at least 0.25 mm. of mercury at 60° C. in a gaseous carrier medium which sustains the electrical discharge; bringing together said exposed surface of said one of said copolymer films of said three-layer laminate and (4) one surface of a thin aluminum sheet holding the resulting four-layer structure together at a temperature above about 10 pounds per square inch for at least 0.01 second to form a four-layer laminate.

9. The process of making a five-layer laminate which comprises taking (1) a polyimide film having a moisture content below about 1% by weight and (2) a first film of a copolymer of tetrafluoroethylene and hexafluoropropylene having a surface rendered cementable by subjecting said surface to an electrical discharge at substantially atmospheric pressure between spaced electrodes, said electrical discharge having an average energy level below 15 electron volts, in an atmosphere containing less than about 5% by volume of the vapor of an organic compound having a vapor pressure of at least 0.25 mm. of mercury at 60° C. in a gaseous carrier medium which sustains the electrical discharge; bringing said polyimide film and said first copolymer film together with the said cementable surface of said first copolymer film in contact with said polyimide film; holding them together at a temperature in the range of 240° to 280° C. at a pressure in excess of about 10 pounds per square inch for at least 0.01 second to form a two-layer laminate; heating said two-layer laminate to a temperature in the range of 350° C. to 500° C. for at least 1 second; bringing together the exposed surface of said polyimide film of said two-layer laminate and the cementable surface of (3) a second film of a copolymer of tetrafluoroethylene and hexafluoropropylene, said cementable surface having been rendered cementable by subjecting said surface to an electrical discharge at substantially atmospheric pressure between spaced electrodes, said electrical discharge having an average energy level below 15 electron volts, in an atmosphere containing less than about 5% by volume of the vapor of an organic compound having a vapor pressure of at least 0.25 mm. of mercury at 60° C. in a gaseous carrier medium which sustains the electrical discharge; holding the resulting three-layer structure together at a temperature in the range of 240° to 280° C. at a pressure in excess of about 10 pounds per square inch for at least 0.1 second to form a three-layer laminate; heating said three-layer laminate at a temperature in the range of 350° C. to 500° C. for at least 1 second; subjecting the exposed surfaces of both of said copolymer films of said three-layer laminate to an electrical discharge at substantially atmospheric pressure between spaced electrodes, said electrical discharge having an average energy level below 15 electron volts, in an atmosphere containing less than about 5% by volume of the vapor of an organic compound having a vapor pressure of at least 0.25 mm. of mercury at 60° C. in a gaseous carrier medium which sustains the electrical discharge; bringing (4) and (5) two thin aluminum sheets, one each, in contact with said exposed surfaces of said copolymer films of said three-layer laminate; holding the resulting five-layer structure together at a temperature above about 10 pounds per square inch for at least 0.01 second to form a five-layer laminate.

10. The process of making a five-layer laminate which comprises taking (1) a polyimide film having a moisture content below about 1% by weight, (2) a first film of a copolymer of tetrafluoroethylene and hexafluoropropylene and (3) a second film of a copolymer of tetrafluoroethylene and hexafluoropropylene, each of said first and said second films having a surface rendered cementable by subjecting said surface to an electrical discharge at substantially atmospheric pressure between spaced electrodes, said electrical discharge having an average energy level below 15 electron volts, in an atmosphere containing less than about 5% by volume of the vapor of an organic compound having a vapor pressure of at least 0.25 mm. of mercury at 60° C. in a gaseous carrier medium which sustains the electrical discharge; simultaneously bringing together said polymide film and said first and said second copolymer film, with said polyimide film sandwiched in between and contacting the said cementable surfaces of said first and said second copolymer films; holding them together at a temperature in the range of 240° to 280° C. at a pressure in excess of about 10 pounds per square inch for at least 0.01 second to form a three-layer laminate; and subsequently heating the laminate to a temperature in the range of 350° C. to 500° C. for at least 1 second; subjecting the exposed surfaces of both of said copolymer films of said three-layer laminate to an electrical discharge at substantially atmospheric pressure between spaced electrodes, said electrical discharge having an average energy level below 15 electron volts, in an atmosphere containing less than about 5% by volume of the vapor of an organic compound having a vapor pressure of at least 0.25 mm. of mercury at 60° C. in a gaseous carrier medium which sustains the electrical discharge; bringing (4) and (5) two thin aluminum sheets, one each, in contact with said exposed surfaces of said copolymer films of said three layer laminate; holding the resulting five-layer structure together at a temperature above about 10 pounds per square inch for at least 0.01 second to form a five-layer laminate.

11. The two-layer laminate prepared as in claim 1.
12. The two-layer laminate prepared as in claim 2.
13. The three-layer laminate prepared as in claim 3.
14. The three-layer laminate prepared as in claim 4.
15. The three-layer laminate prepared as in claim 5.
16. The three-layer laminate prepared as in claim 6.
17. The four-layer laminate prepared as in claim 7.
18. The four-layer laminate prepared as in claim 8.
19. The five-layer laminate prepared as in claim 9.
20. The five-layer laminate prepared as in claim 10.

References Cited

UNITED STATES PATENTS

| | | | |
|---|---|---|---|
| 3,380,974 | 4/1968 | Stilmar | 161—216 X |
| 3,390,067 | 6/1968 | Miller et al. | 117—47 X |
| 3,191,044 | 7/1968 | Kaghan et al. | 156—272 |

HAROLD ANSHER, Primary Examiner

U.S. Cl. X.R.

117—47; 156—272, 306, 331, 333; 161—216